Jan. 30, 1934. A. H. NEULAND Re. 19,065
AUTOMATIC POWER TRANSMISSION
Original Filed Sept. 13, 1927
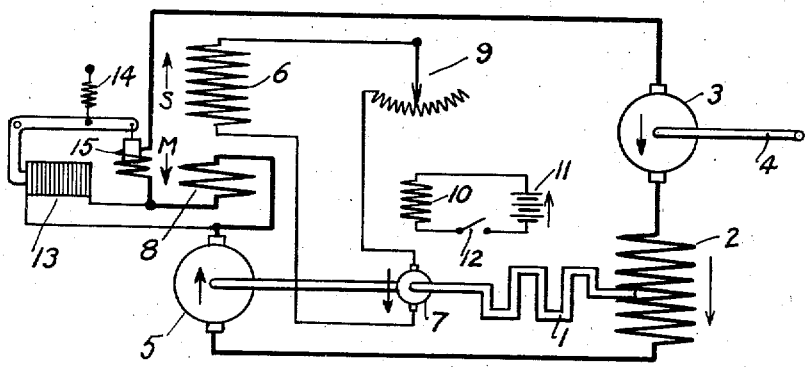
Inventor
ALFONS H. NEULAND
By Ralph B. Stewart
Attorney Reissued Jan. 30, 1934

Re. 19,065

UNITED STATES PATENT OFFICE 19,065

AUTOMATIC POWER TRANSMISSION

Alfons H. Neuland, Irvington, N. J., assignor, by mesne assignments, to Electrogear Corporation, a corporation of Delaware Original No. 1,784,308, dated December 9, 1930, Serial No. 219,227, September 13, 1927. Application for reissue December 6, 1932. Serial No. 645,997

26 Claims. (Cl. 290—29)

My present invention relates to power transmissions and particularly to methods and apparatus for automatically controlling the flow of power from a prime mover to a load for use in motor vehicles and for other purposes.

My invention is particularly adapted for use in the type of apparatus in which a dynamo is rotatively associated with a power shaft and a load shaft by suitable mechanical connections and cooperates with another dynamo to transmit power between the shafts.

An object of my invention is to produce an automatic change in torque and speed between prime mover and load as the torque requirement of the load varies and as the speed of the prime mover and load varies.

Another object is to provide for an automatic change in load speed from underspeeding the prime mover to overspeeding and vice versa as the torque of the prime mover and load varies and as their speed varies.

Still another object is to provide a control which insures the smooth operation of the transmission apparatus and one which prevents surging and reversal of current in the main power circuit.

Another object is to adjust the rate of automatic change and still other objects will appear from the following description.

While my control may be used for other purposes I have herein particularly described it in connection with an apparatus transmitting power from a prime mover to a load of the type consisting of a clutch dynamo interposed between the prime mover and load and a booster dynamo mechanically connected to the prime mover, the two dynamos being electrically interconnected so that power may flow from one to the other. My present improvement is particularly directed to the automatic control and reversal of power flow between the two dynamos and the automatic, smooth and uninterrupted passage of the load speed through synchronism with or past the speed of prime mover. It contemplates reversing the booster field flux in accordance with the troque requirements of the load or in accordance with the speed of the prime mover or that of the load.

The single figure of the drawing is a diagrammatic representation of my invention showing particularly the electric circuits.

Referring to the single figure of the drawing the prime mover or power source is represented by the crank shaft 1 which drives the series field coil 2 mounted on the field system of the clutch dynamo. The clutch armature 3 drives the load shaft 4. The booster armature 5 is also mechanically connected to the crank shaft or power source 1. The booster field system is provided with a coil 6 which will be termed the generating coil energized from a source of current 7 in direction of arrow S.

Referring to the preferred embodiment of my invention, the booster field system is also provided with a series motoring coil 8 traversed by load current in direction of arrow M and producing an M. M. F. in opposition to coil 6. The source of current 7 in this instance is the armature of a small exciting or regulating dynamo driven by the prime mover shaft 1 and connected to coil 6 through a rheostat or ratio changer 9. The exciter is provided with a field coil 10 connected to the battery 11 through the switch 12.

In order to drive the load shaft 4 the prime mover 1 is started and made to rotate at low speed and the switch 12 is closed. The source 7 generates a slight current which flows through booster coil 6 and causes the system to pick up immediately and also determines direction of current flow in main circuit. As the full power from prime mover is applied the relatively strong clutch field coil 2 generates a current in armature 3 and exerts a torque thereon. The strong current at start from armature 3 flows through booster armature 5 and motoring coil 8. The powerful M. M. F. due to coil 8 opposes the slight M. M. F. in coil 6 and reverses the booster field flux and establishes a powerful motoring flux. The booster now exerts a torque on prime mover aiding its forward rotation and in case of an internal combustion engine for the prime mover, prevents it from stalling when engine idles.

The torque to the load flows from two sources, the prime mover and the booster, both torques being transferred to the load so that the torque requirements of the load are met even if they greatly exceed the torque ability of prime mover. As the load shaft 4 begins to rotate, the speed of prime mover increases, the generating action in armature 7 is also increased and so is the current in coil 6, thereby weakening the motoring field and causing the speed difference between clutch armature and field to diminish. This in turn weakens current in main circuit and in coil 8 further helping to weaken motor action of booster armature 5. The load shaft 4 continues to speed up at a faster rate until it nearly equals the speed of crank shaft 1 at which time the M. M. F. due to coil 6 has increased to a point where it has nullified the diminishing flux due to coil 8 and the booster flux has disappeared.

The entire engine power is now directly transferred from the clutch field to the clutch armature and load shaft 4. As the speed of load and engine increase still further, the M. M. F. due to coil 6 begins to predominate and reverses the booster flux. The booster has now become a generator and is gradually assuming the duty of energizing the system and is forcing the armature to pass through synchronism and overspeed the field or prime mover while carrying its load. As before, the clutch armature 3 speeds up at a higher rate than the prime mover until the load speed may exceed the engine two or three times. Only a portion of the engine torque is now transferred directly to clutch, the balance being absorbed by the booster and transformed into electrical energy and then flowing into the clutch where it supplies the overspeed power component. It should be noted that a reversal of power flow between clutch and booster has taken place as the load shaft has changed from underspeeding to overspeeding.

It is seen that the transmission is self-controlling or automatic as the speed of load or engine varies. It is also an object of the invention to automatically vary the engine speed for any given load speed in accordance with variations in the torque requirements of the load. When the load is light the current in coil 8 and the opposition to coil 6 are also slight allowing M. M. F. due to coil 6 greatly to predominate and causing engine to operate at relatively low speed. If torque requirement of load is great, engine is made to produce more torque, as by opening throttle, current in main circuit and coil 8 is instantly increased and so is the opposition to coil 6. This lessens the torque drawn from engine by the booster when overspeeding and increases torque delivered to engine when underspeeding as a result of which engine is able to speed up and delivers more horse power so that the load receives the required torque.

The inherent automatic regulation is further aided by the compressible pile regulator 13 which is held under compression by the spring 14 when the load and current in coil 15 are light, the pile shunting current away from coil 8 lessening its opposition to coil 6 which further slows down engine speed for economical operation. As the load and current in coil 15 increase the pile 13 is opened and the full load current flows through coil 8 enabling it to exert its full opposition to coil 6 resulting in greater engine speed and horse power delivery.

Where the direct action of series coil 8 is sufficient to perform the regulating function, the regulator 13 may be omitted.

The rheostat 9 operates as a ratio changer and is useful in adjusting the rate of automatic change between engine and load. For instance, when engine torque has decreased as by loss of compression, the regulator can be adjusted to decrease current flow through coil 6 with the result that a relatively greater torque is produced at the load at the expense of a higher engine speed.

In accordance with my invention surging and reversal of current in main circuit are effectively prevented, as any sudden current decrease, especially when underspeeding while the booster flux has motoring direction, will cause the M. M. F. in coil 6 to predominate and reverse the booster flux, thereby generating in armature 5 a potential of direction shown by arrow and instantly counteracting any tendncy of current in main circuit to surge or reverse.

Reference is made to the following U. S. patents issued to me on copending applications relating to transmission systems of the same general type: 1,773,843 (now Reissue 18,888); 1,773,844; 1,773,845; 1,784,309; 1,820,861; 1,820,862; 1,820,863 and 1,820,864. Applications are now pending for the reissue of Patents 1,784,309 and 1,820,861.

I claim:

1. In combination an engine, a load shaft, a clutch dynamo interposed between engine and load, a booster dynamo operatively connected to engine and electrically connected to clutch dynamo provided with pole pieces and field coils, a regulating dynamo operatively connected to engine and electrically connected to the field coils and means for varying the speed of engine and regulating dynamo operative to vary the current in the field coils and reverse the magnetic flux in the pole pieces.

2. In combination, an engine shaft, a load shaft, a reversible dynamo rotatively connected with both shafts, a second dynamo rotatively connected with the engine shaft and electrically connected to the first dynamo provided with pole pieces and field coils, a regulating dynamo rotatively connected to engine shaft and electrically connected to the field coils, and means for varying the speed of engine and regulating dynamo operative to vary the current in the field coils and to reverse the magnetic flux in the pole pieces.

3. In combination, an engine having a shaft, a load shaft, a reversible dynamo rotatively connected with both shafts having a series field coil, a second dynamo rotatively connected with the engine shaft having pole pieces, a series field coil and an auxiliary field coil, a load circuit including a series field coil on each dynamo adapted to multiply torque to load in one stage of operation, a regulating dynamo rotatively connected to engine shaft and electrically connected with the auxiliary field coil, and means for increasing speed of engine and regulating dynamo adapted to reverse the magnetic flux in the field poles for operation of the reversible dynamo in another stage.

4. In combination, an engine shaft, a load shaft, a reversible dynamo rotatively connected with both shafts, a second dynamo rotatively connected with the engine shaft and electrically connected to the first dynamo provided with pole pieces and series and auxiliary field coils, a regulating dynamo rotatively connected to engine shaft and electrically connected to the auxiliary field coil, means for varying the speed of engine and regulating dynamo, and means for shunting the series field coil.

5. In combination, an engine shaft, a load shaft, a reversible dynamo rotatively connected with both shafts, a second dynamo rotatively connected with the engine shaft having pole pieces and a plurality of field coils, a regulating dynamo electrically connected to one of the field coils adapted to establish a minor generating flux in the pole pieces during relatively low speed of engine shaft, a load circuit including another field coil and the first dynamo adapted to reverse the minor generating flux and establish a major motoring flux in the pole pieces when the load on load shaft is relatively heavy, and means for increasing the speed of regulating dynamo adapted to reverse the motoring flux and establish a major generating flux in the pole pieces.

6. In combination, an engine shaft, a load shaft, a dynamo rotatively associated with both shafts, a second dynamo rotatively associated with the engine shaft and having pole pieces provided with series and auxiliary field coils, a source of current connected to the auxiliary field coil adapted to magnetize the field poles in generating direction, a load circuit including the first dynamo and series field coil adapted to magnetize the field poles in motoring direction, and means for shunting the series field coil operative to reverse the magnetism in the field poles from motoring direction to generating direction.

7. In combination, a power shaft, a load shaft, a dynamo operatively connected in fixed speed relation with the power shaft and having a field element provided with a plurality of field coils, a reversible second dynamo rotatively connected with both shafts having a field element provided with a field coil, a load circuit including a field coil on each dynamo for establishing magnetomotive forces in the field elements substantially in proportion to current in the load circuit having motoring direction in the first dynamo and generating direction in the second dynamo, a variable speed regulating generator rotatively connected with one of the shafts and electrically connected to a second field coil on the field element of the first dynamo and adapted by the variation in its speed of rotation to reverse the magnetism in the field element of the first dynamo with respect to that in the second dynamo.

8. In combination, an engine shaft, a load shaft, a dynamo rotatively associated with both shafts, a second dynamo rotatively associated in fixed speed relation with the engine shaft and having pole pieces provided with series and auxiliary field coils, a source of current connected to the auxliary field coil adapted to magnetize the field poles in generating direction, a load circuit connecting said dynamo and including the series field coil adapted to magnetize the field poles in motoring direction, and means responsive to speed variations of one of said shafts for causing the magnetizing action of one of said coils to exceed that of the other and reverse the magnetism in the pole pieces of the second dynamo.

9. In combination, a power shaft, a load shaft, a dynamo operatively connected in fixed speed relation with the power shaft and having a field element provided with a field coil, a reversible second dynamo rotatively connected with both shafts having a field element provided with a field coil, a load circuit including a field coil on each dynamo for establishing magnetomotive forces in the field elements substantially in proportion to current in the load circuit having motoring direction in the first dynamo and generating direction in the second dynamo, a variable speed regulating generator rotatively connected with one of the shafts and electrically connected to the first dynamo and adapted by the variation in its speed of rotation to reverse the magnetism in the field element of the first dynamo with respect to that in the second dynamo.

10. In combination, a variable speed driving shaft, a variable speed load shaft, a reversible dynamo rotatively connected with both shafts, a second dynamo rotatively connected in fixed speed relation with the driving shaft and having a series field coil, an electric load circuit including the dynamos and the series field coil connected in motoring direction, and means responsive to the variations in the speed of one of the shafts for causing the second mentioned dynamo to act as a generator.

11. In combination, a variable speed power shaft, a variable speed load shaft, a dynamo rotatively connected in fixed speed relation with the power shaft and having a field element provided with a field coil, a reversible second dynamo rotatively connected with both shafts, a load circuit including said dynamos and field coil adapted to magnetize said field element substantially in proportion to the load on the load shaft, and means including a variable speed regulating generator rotatively connected with one of the shafts and electrically connected to the first dynamo adapted by the variation in the speed of the regulating generator to reverse the magnetic flux in the field element of the first dynamo.

12. In combination, a power shaft, a load shaft, a dynamo rotatively connected in fixed speed relation with the power shaft, a reversible second dynamo rotatively connected in variable speed relation with both shafts, a load circuit connecting said dynamos, means tending to variably magnetize the first dynamo in one direction in accordance with the current variations in said load circuit, and means tending to variably magnetize the first dynamo in the opposite direction in accordance with speed variations of one of said shafts.

13. In combination, a power shaft, a load shaft, a power dynamo operatively connected in fixed speed relation with the power shaft and having a field element provided with a field coil, a reversible second power dynamo rotatively connected with both shafts having a field element provided with a field coil, a load circuit including a field coil on each dynamo for establishing magnetomotive forces in the field elements substantially in proportion to current in the load circuit having motoring direction in the first dynamo and generating direction in the second dynamo, and means responsive to speed variations of one of said shafts to change the operation of said first dynamo to a generator.

14. A power transmission system including an engine having a shaft, a load shaft, a power dynamo connected in fixed speed relation with the engine shaft adapted to operate as a motor in the first stage of acceleration and as a generator in the second stage of acceleration; a second power dynamo connected in variable speed relation with both shafts and adapted to operate as a generator in the first stage of acceleration and as a motor in the second stage of acceleration, a load circuit connecting said dynamos for operating the first dynamo as a motor and the second dynamo as a generator, means for causing the first dynamo to change from a motor to a generator in response to an increase in the speed of one of the shafts, and means included in said load circuit for causing the first dynamo to change from a generator to a motor in response to an increase in the torque applied to the load shaft.

15. In combination, a variable speed power shaft, a variable speed load shaft, a dynamo rotatively connected in fixed speed relation with the power shaft and having a field element provided with a field coil, a reversible second dynamo rotatively connected with both shafts and having a field element provided with a field coil, a load circuit including both dynamos and a field coil on each dynamo connected in series circuit relation adapted to magnetize both field elements substantially in proportion to the load on the load shaft, and means including a variable speed regulating generator rotatively connected with one of the shafts and electrically connected to the first dynamo adapted by the variation in the speed of the regulating generator to reverse the magnetic flux in the field element of the first dynamo.

16. In combination, a power shaft, a load shaft, a dynamo rotatively connected in fixed speed relation with the power shaft, a reversible second dynamo rotatively connected in variable speed relation with both shafts, a load circuit connecting said dynamos, means tending to variably magnetize the first dynamo in one direction in accordance with the current variations in said load circuit, and means tending to variably magnetize the first dynamo in the opposite direction in accordance with speed variations of the power shaft.

17. The means for uninterruptedly accelerating a load, which includes a driving shaft, a load shaft, a reversible dynamo rotatively connected with both shafts, a unidirectionally rotating second dynamo rotatively connected in fixed speed relation with the driving shaft, a closed load circuit including both dynamos, a regulating dynamo connected with one of the shafts and means including said regulating dynamo for varying the rate of acceleration of engine shaft with respect to the rate of acceleration of load shaft.

18. In combination, a power shaft, a load shaft, a dynamo rotatively connected with both shafts, a second dynamo rotatively connected with the power shaft, a variable speed regulating dynamo rotatively connected with one of the shafts, means responsive to speed variations of the regulating dynamo for operating the second dynamo as a motor when the speed of regulating dynamo is relatively low and for operating the second dynamo as a generator when the speed of regulating dynamo is relatively high.

19. In combination, a power shaft, a load shaft, a unidirectionally rotating dynamo connected in fixed speed relation with said power shaft, a second dynamo rotatively connected with both shafts, a load circuit connecting said dynamos including means for operating said first dynamo as a motor in one stage of operation, and means responsive to speed variations of one of said shafts for changing the operation of said first dynamo to a generator.

20. In combination, a power shaft, a load shaft, a unidirectionally rotating dynamo connected in fixed speed relation with said power shaft, a second dynamo rotatively connected with both shafts, a load circuit connecting said dynamos including means for operating said first dynamo as a motor in one stage of operation, and means responsive to an increase in speed of one of said shafts for changing the operation of said first dynamo to a generator.

21. In combination, a power shaft, a load shaft, a unidirectionally rotating dynamo connected in fixed speed relation with said power shaft, a second dynamo rotatively connected with both shafts, a load circuit connecting said dynamos including means for operating said first dynamo as a motor in one stage of operation, and means responsive to an increase in speed of one of said shafts for changing the operation of said first dynamo to a generator and for thereafter progressively varying the speed torque ratio between said drive shaft and said load shaft.

22. The means for uninterruptedly accelerating a load, which includes a driving shaft, a load shaft, a reversible dynamo rotatively connected with both shafts, a unidirectionally rotating second dynamo rotatively connected in fixed speed relation with the driving shaft, a closed load circuit including both dynamos, and means responsive to speed variations of one of said shafts for progressively varying the rate of acceleration of driving shaft with respect to the rate of acceleration of load shaft.

23. In combination, an engine shaft, a load shaft, a dynamo rotatively connected with both shafts having a field element, a second dynamo rotatively connected in fixed speed relation with the engine shaft having a field element, a load circuit connecting said dynamos including means for magnetizing the field element of one of the dynamos with load current, and a separate source of current for magnetizing said field element in the opposite direction whenever load current ceases to flow.

24. In combination, a power shaft, a load shaft, a dynamo rotatively connected with both shafts and having a field element, a second dynamo rotatively connected in fixed speed relation with the power shaft and having a field element, a load circuit connecting said dynamos including means for magnetizing both field elements with load current from one of the dynamos, and means separate from said magnetizing means for reversing the magnetization in one of the field elements whenever load current ceases to flow.

25. In combination, a power shaft, a load shaft, a dynamo rotatively connected with both shafts and having a field element, a second dynamo rotatively connected in fixed speed relation with the engine shaft and having a field element, a load circuit connecting said dynamos including a series field coil on the second dynamo connected in motoring direction, and a separate source of current for maintaining a magnetizing force in the field element of the second dynamo in opposition to the magnetizing force of said series field coil.

26. Apparatus for transmitting power including a power member, a load member, a dynamo connected in fixed speed relation with the power member and having a field element an armature and a field coil, a second dynamo connected in variable speed relation with the power and load members and having a field element an armature and a field coil, an electric load circuit including both armatures and both field coils, all connected in series circuit relation, an auxiliary field coil for the first dynamo, and means including a separate source of current connected to said auxiliary coil for maintaining a magnetizing force in the field element of the first dynamo opposing the magnetizing force of the current in the load circuit.

ALFONS H. NEULAND.